United States Patent [19]

Pering et al.

[11] 3,867,707

[45] Feb. 18, 1975

[54] CONTROLLED SIGNAL RECEIVER

[75] Inventors: Richard D. Pering, Palo Alto; James A. Hall, Mountain View, both of Calif.

[73] Assignee: Hewlett-Packard Company, Palo Alto, Calif.

[22] Filed: Apr. 19, 1973

[21] Appl. No.: 352,806

[52] U.S. Cl. .................. 329/132, 307/237, 325/347

[51] Int. Cl. .................. H03d 3/00

[58] Field of Search .................. 329/131–136; 307/237; 325/347, 348, 482; 332/52, 31 R

[56] References Cited

UNITED STATES PATENTS

| | | | |
|---|---|---|---|
| 3,188,571 | 6/1965 | Michael | 325/348 X |
| 3,374,437 | 3/1968 | Heald | 325/348 X |
| 3,404,354 | 10/1968 | Verlinden | 332/31 R |
| 3,663,900 | 5/1972 | Peterson | 307/237 X |

*Primary Examiner*—Alfred L. Brody
*Attorney, Agent, or Firm*—A. C. Smith

[57] ABSTRACT

A microwave FM receiver is provided comprising a tuned radio frequency receiver utilizing microwave integrated circuits, the system including a novel automatic gain control limiter for AM suppression and a novel discriminator circuit for FM demodulation, said discriminator comprising a MIC transmission line structure provided with dissipative elements to absorb harmonics of the carrier frequency.

1 Claim, 8 Drawing Figures

CONTROLLED SIGNAL RECEIVER

BACKGROUND OF THE INVENTION

A synchronous satellite carrying television transmitters will soon be operating to direct television programs, for example, educational TV programs, over the United States. With an educational TV band of 2.5 to 2.69 GHz, and with each separate channel being about 23 MHz wide, a number of different programs may be transmitted simultaneously. Initially two channels will be operating, one with its video signal centered at about 2.566 MHz and the second at about 2.667 MHz, but it is desirable that the receiver system be operable over the entire educational TV band to allow for expanded programming. Since the principal purpose of this TV transmission satellite is to serve educational institutions, particularly small schools in remote areas and hospitals, it is necessary that the receiver apparatus located at the ground receiver station be simple enough for operation and use by a lay person or teacher untrained in the operation of sophisticated electronic devices. The receiver must have a high reliability since servicing in remote areas must be avoided. Also, since these receivers will be used by the thousands, the unit cost must be held within reasonable limits, while still maintaining the reliability and ease of operation.

The transmission system utilized in this project employs wideband frequency modulation (20 MHz peak-to-peak) in order to achieve the desired video signal-to-noise performance. The signal is transmitted from a synchronous satellite with an effective radiated power of +50 dBm which provides sufficient signal strength to meet system objectives when using a 10-foot parabolic receiving antenna at each ground station. Such antenna may be mounted on the ground or on the roof of a school house or hospital and is coupled to the FM receiver via cables which will vary in length according to the receiver location relative to the antenna location.

Generally, the receiver system employed in such a system would mix the incoming signal down to a lower intermediate frequency and then tune the IF or local oscillator to select the channel of interest, especially since the received signal is at such a high frequency (2.6 GHz). Although such an approach may give the desired technical performance, it will not necessarily lead to the desired reduction in cost of such a receiver as they go into mass production, since this approach would fail to take advantage of the state-of-the-art in microwave integrated circuit (MIC) techniques. As such state-of-the-art develops, costs will reduce for MIC receivers and the total cost for this educational TV system project with its large number of receivers will be substantially lower than one employing the conventional mixer-IF techniques.

SUMMARY OF THE PRESENT INVENTION

The present invention provides an FM receiver for use at microwave frequencies including the educational TV band of 2.5 to 2.69 GHz which comprises a tuned radio frequency (TRF) receiver circuit utilizing microwave integrated circuit (MIC) techniques, resulting in present state-of-the-art performance while providing reliability, simplicity of operation, relatively low cost, and mass production capability. The circuit operates directly on the 2.5 to 2.69 GHz signal without mixing down to an IF.

This novel receiver contains microelectronic circuits that provide RF amplification, automatic gain control (AGC) limiting, and an RF discriminator, as well as a channel-select filter, video amplifiers, and audio subcarrier demodulators. All of the RF amplifiers are known forms of thin-film units and the filter circuits are of conventional design at these frequencies.

A novel limiter/AGC is utilized to provide the desired receiver characteristics relative to AM suppression; the limiter is important since limiting must be performed at a relatively high frequency, i.e., 2.6 GHz. The novel AGC type of limiter of the present invention meets the design goal of greater than 30 dB of limiting for 30 percent AM modulation, which goal is difficult using conventional techniques such as saturating amplifiers and diode limiters. The limiting is accomplished by a very wide band (0–40 MHz) AGC loop providing greater than 30 dB of limiting and also AGC and signal-level monitoring. Since there is no signal clipping as in conventional limiters, no carrier harmonics are generated so that no filter is needed between the limiter and the discriminator. This MIC form of limiter uses compact, wideband RF components which meet the severe requirements on loop time delay imposed by the wideband feedback AM suppression system.

The discriminator used in this novel receiver for FM demodulation is also a MIC transmission-line structure that is linear from 2.5 to 2.69 GHz, with a constant 50 ohm input impedance. The frequency selective elements are formed by two 70 ohm transmission lines each 13/8λ long at 2.6 GHz, one line being open-circuited and the other short-circuited. The novel discriminator of this invention is provided with dissipative elements in the transmission lines positioned at the proper points to absorb harmonics that, for example, may be generated in the detector diodes which give rise to irregularities in the discriminator frequency/voltage curve, without affecting discriminator performance in the desired frequency range.

Figure 2:
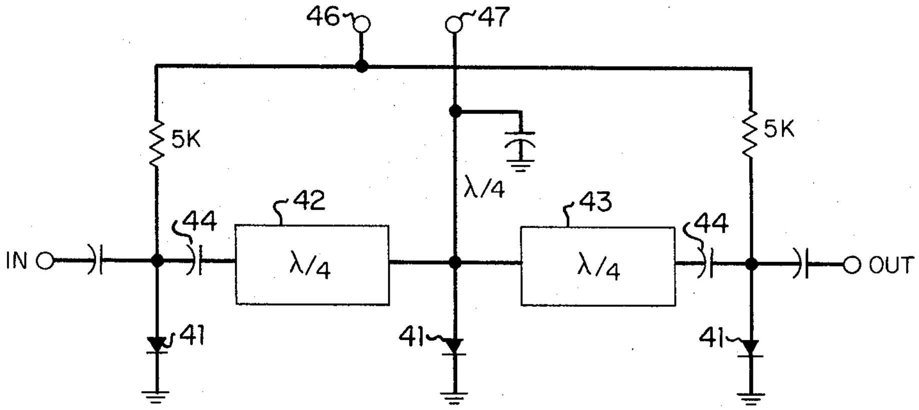
FIG. 2 is a schematic diagram of the PIN diode attenuator utilized in the limiter section of the receiver.
Figure 3:
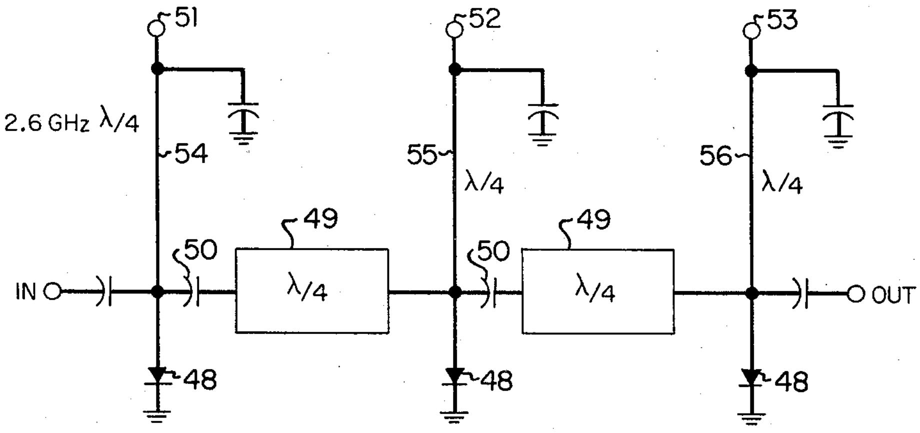
FIG. 3 is a schematic diagram of the Schottky diode modulator used in the limiter of the receiver.
Figure 4:
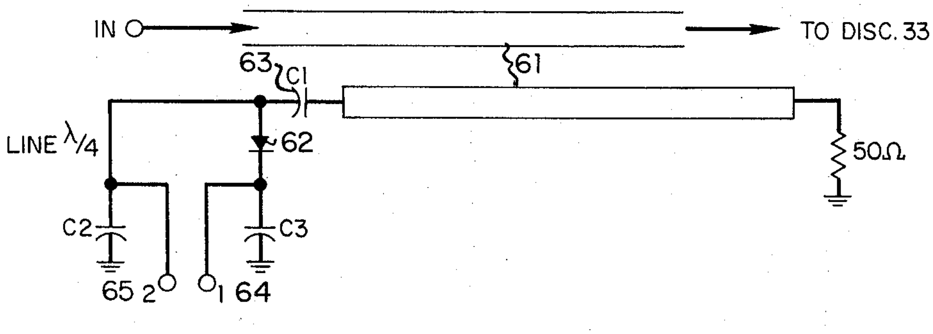
FIG. 4 is a schematic diagram of the directional detector utilized in the limiter.

FIGS. **5*a* and 5*b* are schematic diagrams of the AGC/video amplifier section of the limiter portion of the receiver with terminals leading to the PIN diode circuit of FIG. 2 and to the Schottky diode modulator of FIG. 3**.

Figure 6:
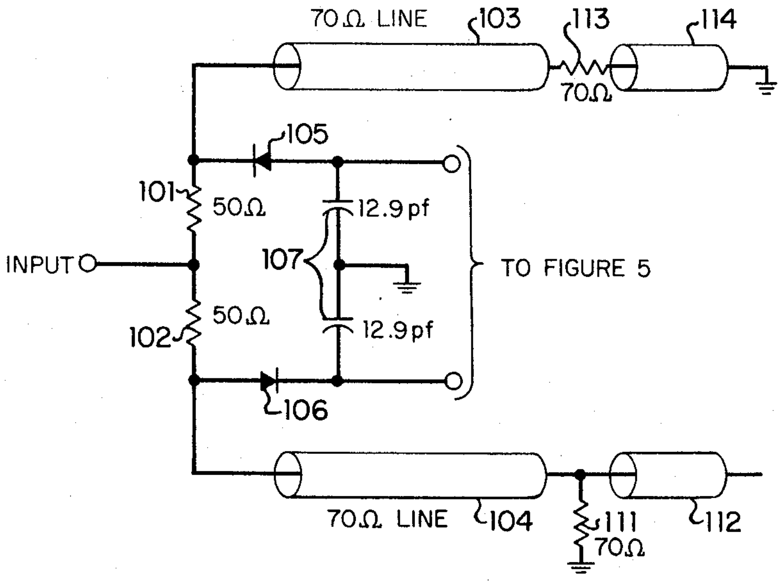

FIG. 6 is a schematic diagram of the novel discriminator of the receiver.

Figure 7:
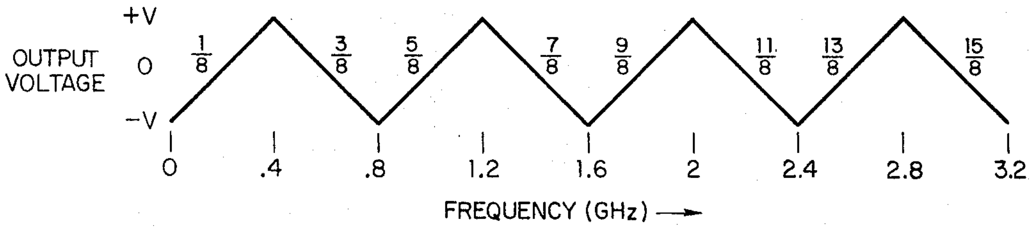

FIG. 7 is a plot of the output voltage of the discriminator plotted versus frequency for transmission lines cut at various wavelengths from ⅛λ to 15/8λ.

DESCRIPTION OF THE PREFERRED EMBODIMENT

Figure 1:
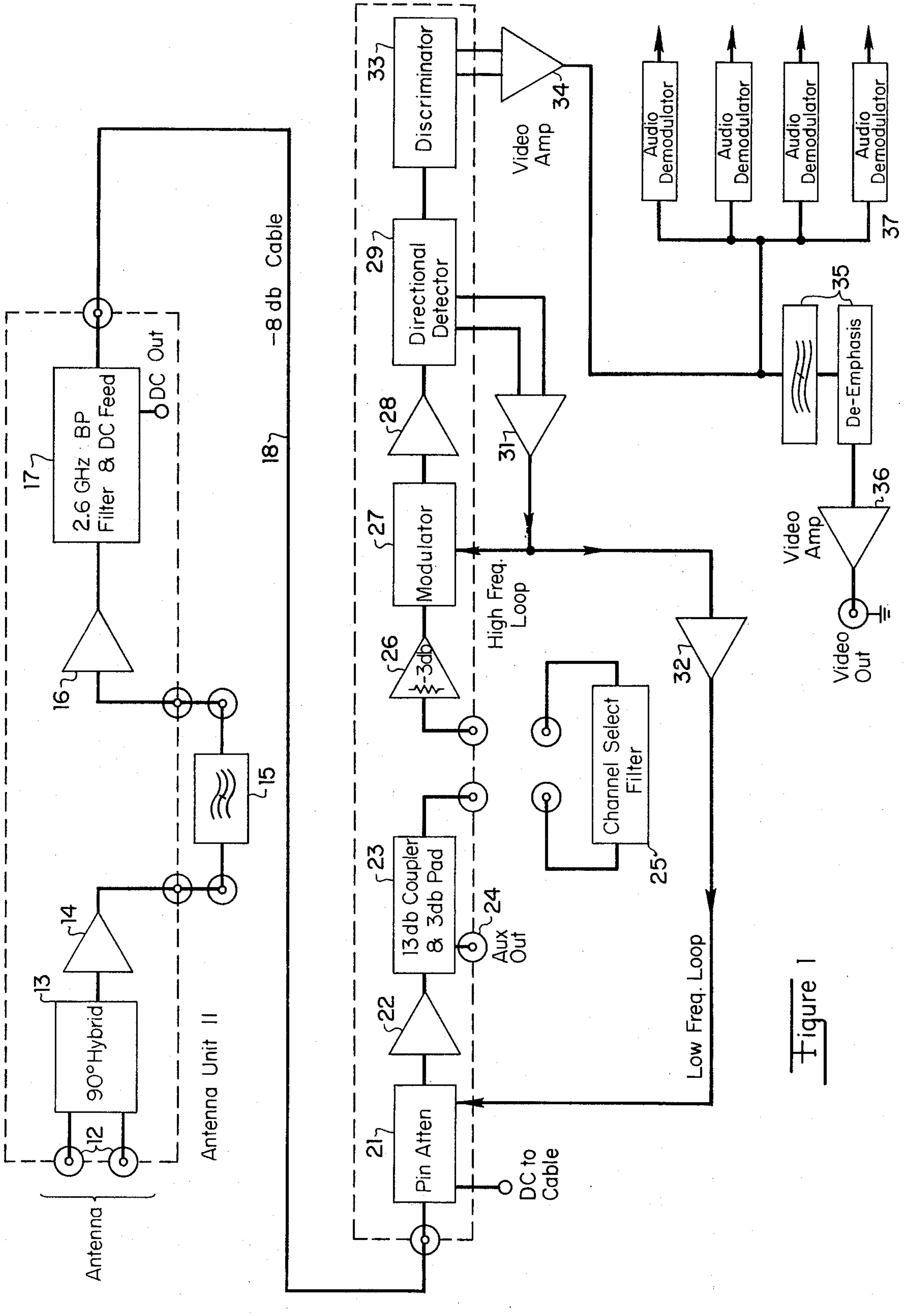
FIG. 1 is a block diagram of the novel microwave FM receiver of the present invention.

Referring now to FIG. 1 the receiver system comprises an antenna unit 11 mounted with the antenna and provided with a pair of input terminals 12 for receiving the two orthogonal signals obtained from vertical and horizontal dipoles in the antenna; this antenna unit 11 has about 55 dB of gain, a 300 MHz bandwidth, and a noise figure of better than 4 dB. The antenna unit 11 is provided with a 90° hybrid circuit 13 for combining the orthogonal incoming signals and the combined signal is then amplified in solid state preamplifier 14 and transmitted to a notch filter 15, if needed, to filter out undesired signals such as those generated by a microwave oven operating in the band of 2,450 ± 50 MHz. A second solid state amplifier 16 and a 2.6 GHz bandpass filter 17 for passing the desired band of from 2,500 to 2,690 MHz is provided and the output is coupled via a suitable RF cable 18 to the remainder of the receiver circuitry located indoors. The RF cable 18, regardless of its length, e.g., 25 to 100 feet, is designed to have a total loss of approximately 7 dB. The indoor end of the cable is coupled to the input of a PIN diode attenuator 21 (shown in more detail in FIG. 2) which is part of the automatic gain control loop circuit. The output of the PIN diode attenuator 21 passes through an RF amplifier 22 and then through a directional coupler 23 so that a small portion of the signal may be directed off through an auxiliary output 24. This auxiliary output can be fed to a down converter or special receiver.

The main portion of the signal passes from the directional coupler 23 to a channel select filter 25. At the present time, two channels are in service, one at 2,566.7 MHz and the other at 2,667.5 MHz, and therefore two channel select filters are presently employed and selected to pass the desired channel. The channel filter is a three pole, interdigital design, formed from an aluminum extrusion. By utilizing temperature compensated resonators, a frequency shift of less than 2 ppm/°C is assured; the 3 dB bandwidth is 23.5 MHz and insertion loss is less than 1.7 dB.

The output of the channel select filter 25 is transmitted to an additional gain amplifier 26 which is coupled to the channel select filter 25 via a 3 dB pad which corrects for any mismatch of the amplifier input impedance; the filtered signal is amplified to a level suitable for operating the directional detector stage of the system included in the automatic gain control type of limiter circuit.

The differential gain, differential phase, and threshold performance of an FM receiver depends heavily on the amount of AM limiting or suppression and the lack of amplitude modulation to phase modulation conversion occurring in the limiter. In the present type of tuned radio frequency receiver, the limiter is particularly difficult since the limiting must be performed on a very high frequency signal, e.g., 2.6 GHz, whereas the normal approach is to mix down to a lower IF such as 70 MHz where limiting is more easily achieved. At the higher carrier frequency, it is difficult to meet the goal of greater than 30 dB of limiting for 30 percent AM modulation using the conventional techniques, i.e., saturating amplifiers and diode limiters. The limiting system employed in the receiver of the present invention not only provides greater than 30 dB of limiting, but it provides AGC and signal-level monitoring as well.

A second consideration is the bandwidth of the limiter; with the carrier of 2.6 GHz the concern is the noise in the region of ± 12 MHz of the center or carrier frequency. The AM limiting must be provided over the entire bandwidth to get rid of the noise over the complete bandwidth of the video signals, and the limiter of the present invention accomplishes this desired goal.

The limiter/AGC circuit includes a Schottky diode modulator 27 which receives the input from the amplifier 26 and provides an output via amplifier 28 to a thin-film directional detector 29 which serves as an AM detector for the signal, sensing any AM modulation thereof and giving a detector output proportional to any amplitude fluctuation on the FM signal such as noise, fades, etc.

The detector output is amplified by a video amplifier 31 and then applied in the proper phase in a negative feedback manner to the AM modulator 27, i.e., the Schottky diode modulator, to provide the attenuation needed to hold the FM signal level constant. This operation is in the form of an AGC loop which detects AM variations, amplifies them, and feeds them back in a negative feedback manner to thereby substantially reduce the AM modulation.

Since the AM modulation to be eliminated ranges between 0 and 10 MHz, two feedback loops are provided. One feedback loop via amplifier 31 to the modulator 27 is the high frequency loop and suppresses the AM modulation between 10 KHz and 100 MHz while a second loop including the video amplifier 31, amplifier 32, and the PIN diode attentuator 21 takes care of the lower frequency AM, e.g., 0 to 10 KHz.

Although the system could have been implemented with only one feedback loop, it is easier to split the task of AM suppression between a high frequency loop including modulator 27 and a low frequency loop including PIN diode attenuator 21. The resultant closed-loop amplitude modulation suppression is greater than 32 dB from 0 to 10 MHz. In addition, the output level to the discriminator is maintained at +10 dBm ± 0.3 dB for all normal input signal levels and operating temperatures. An additional advantage of the present AM suppression technique is that, since there is no signal clipping as with more conventional forms of limiters, no harmonics are generated by the limiter. Therefore, the normal form of filtering needed between the limiter and discriminator of a conventional system may be omitted from the present circuit.

The output of the limiter stage of this receiver is then coupled to the discriminator or FM demodulation circuit 33, the video signal output being transmitted to the video amplifier 34 and then through a filter and deemphasis network 35 to a second video amplifier 36 which provides the output to the TV receiver. The frequencies in the 4.64 to 5.36 MHz range are applied to the audio demodulators 37.

Referring now to FIGS. 2, 3, 4, and 5, the components utilized in the AGC/limiter stages of the present receiver are shown in more detail. The PIN diode attenuator 21 (FIG. 2) comprises three diodes 41 coupled via the $\lambda/4$ transmission lines 42 and 43 at 2.6 GHz, the lines being isolated DC-wise by the capacitors 44. The feedback control for this PIN diode attenuator is fed from amplifier 32 via terminals 46 and 47. PIN diodes, as opposed to Schottky diodes, are preferred at this stage since they give a larger attenuation range and are more linear, although they do not respond as fast to changes in DC bias; 100 KHz is about their fastest response time to DC bias changes.

The Schottky diode demodulator circuit of FIG. 3 comprises three diodes 48 and two ¼ wavelength lines 49 at 2.6 GHz isolated DC-wise by the capacitors 50. The DC bias and 10 KHz to 100 MHz modulation is fed in via terminals 51, 52 and 53 and the quarter wavelength lines 54, 55 and 56, respectively, to prevent the RF signal from going back into the amplifiers shown in the schematic of FIG. 5.

The input RF signal to the AM detector 29 (FIG. 4) enters a 6 dB directional coupler 61 formed in microstrip. Most of the signal continues on through to the discriminator 33 but a portion thereof, a signal which is 6 dB down, is coupled into a diode detector 62. The diode detector 62 is isolated DC wise from ground through a capacitor 63 and forms an output on leads 64 and 65 which comprises a DC level or video level which is proportional to the level of the incoming RF signal. The output from the AM detector on terminals 64 and 65 is fed to the first video amplifier 31 and then out through terminals 51, 52 and 53 (FIG. 5*a*) to the Schottky diode modulator. The AM detector output also passes through amplifier 31 and then through the second video amplifier 32 to the PIN diode attenuator via terminals 46 and 47.

Figure 5A:
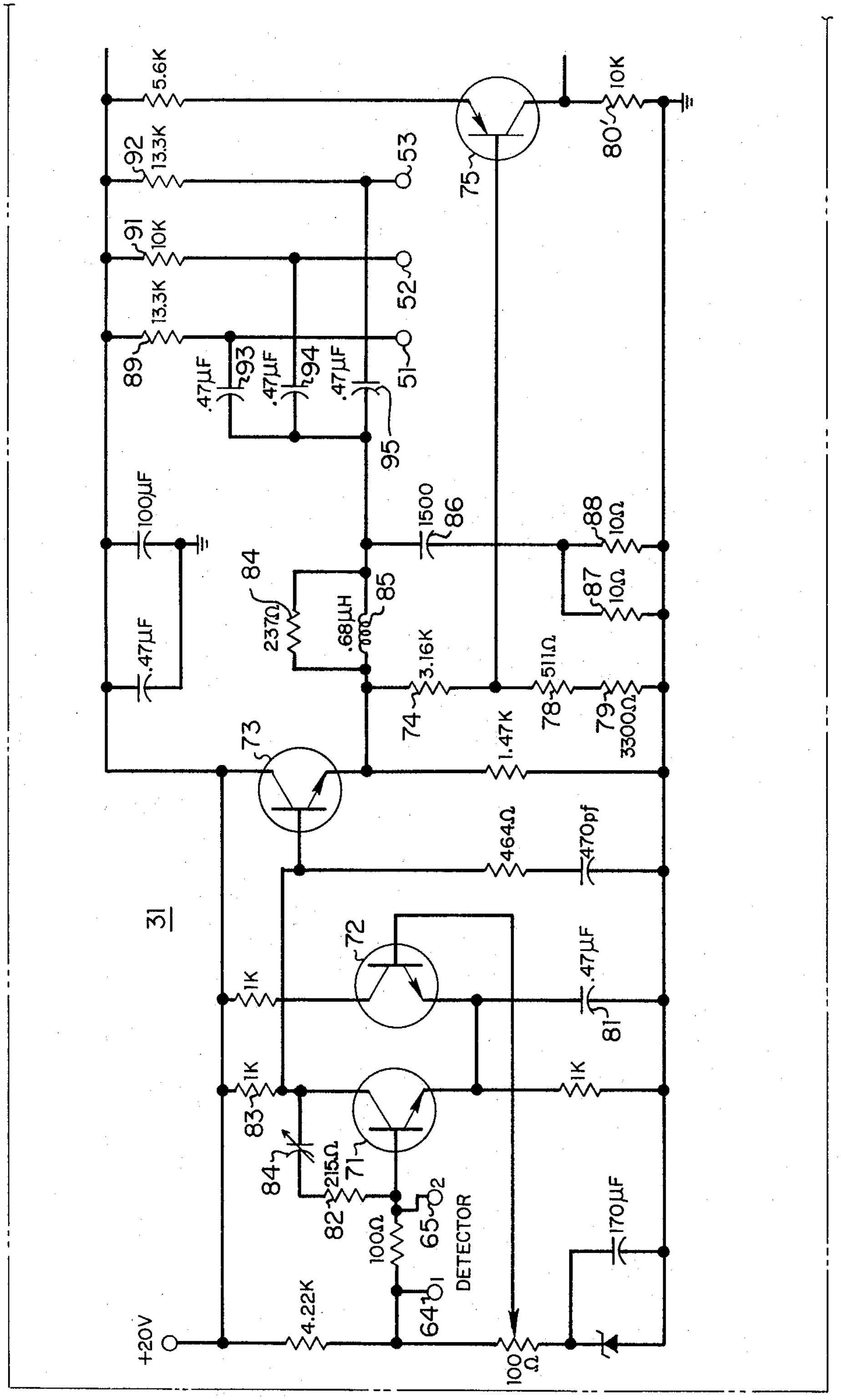
Figure 5B:
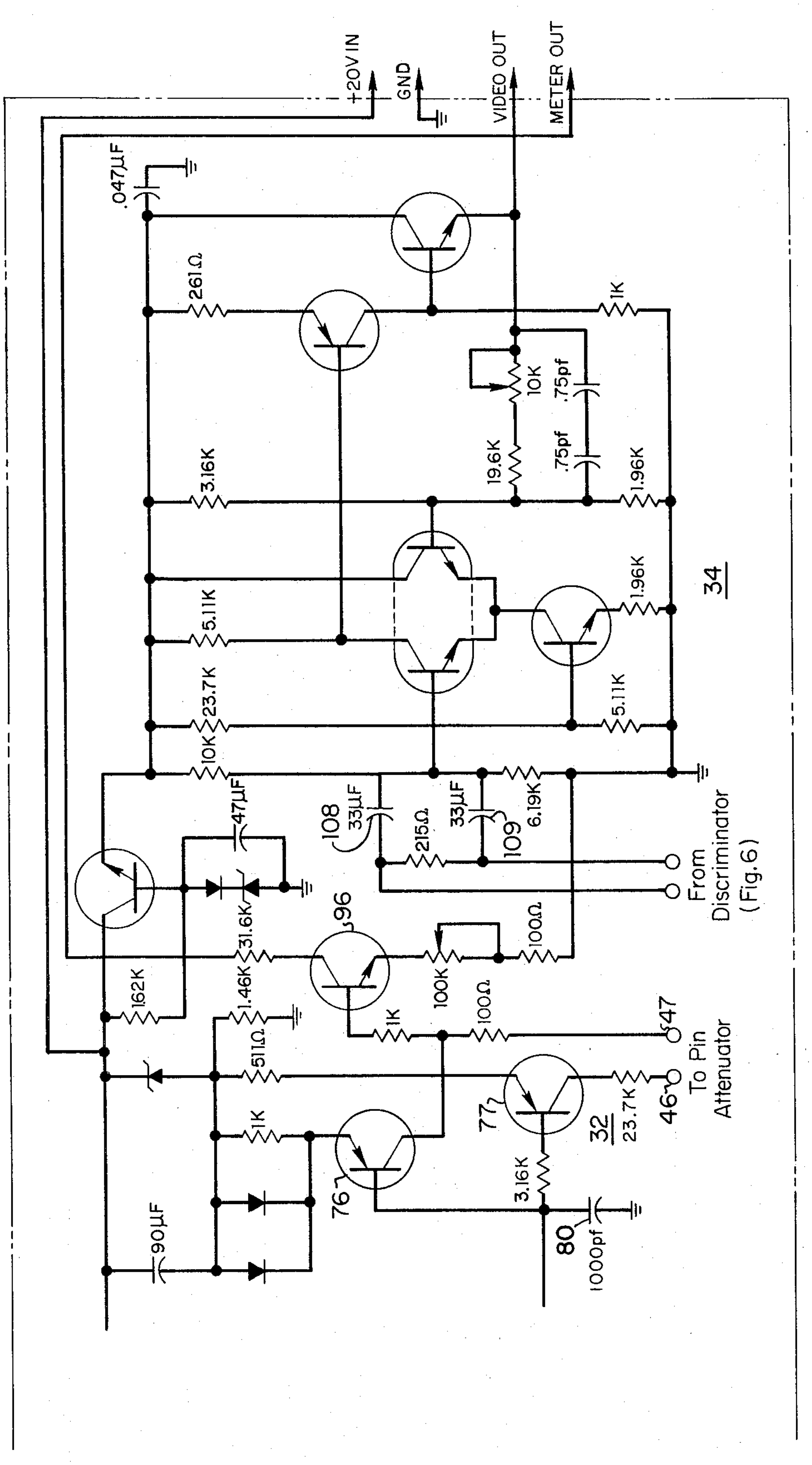

The circuitry included in the amplifiers 31, 32 and 34 is shown in detail in FIG. 5*a* and 5*b;* the PIN attenuator is coupled to this circuitry via terminals 46 and 47 and the Schottky diode modulator is coupled via terminals 51–53. At low frequencies transistors 71 and 72 act as a differential amplifier for the input signal coming in on the leads 64 and 65 from the directional detector, the output passing through the emitter follower transitor 73 and through resistor 74 to the input of the common emitter transistor amplifier 75. The output of amplifier 75 passes to additional amplifiers 76 and 77 which amplify the signal before it is applied to the low frequency modulator, i.e., the PIN attenuator, via terminals 46, 47. Resistor 78 and capacitor 79 serve as a lead-lag network and capacitor 80 and resistor 80′ provide a 10 KHz pole in the low frequency loop, the loop including amplifier 32 operates on the low frequencies from 0 to 10 KHz.

At the higher frequencies of 10 KHz to 100 MHz, capacitor 81 forms an emitter bypass for transistor 71 and there is no longer a differential amplifier action; amplifier 71 acts as a common emitter amplifier. Amplifier 73 amplifies the signal further in a common collector state and the signal output is applied through three terminals 51–53 to the Schottky diode modulator. This circuit includes several lead-lag networks, the first of which is formed by resistors 82 and 83 and capacitor 84 which, at about 10 MHz, starts decreasing the gain of the high frequency feedback loop until at about 50 MHz it reaches unity gain. Resistor 84 and inductor 85 form a similar kind of network while capcitor 86 and resistors 87 and 88 form a third network. Use of these lead-lag networks allow the open loop gain to be decreased as a function of frequency without the total open loop phase shift exceeding 180° at the frequency where the open loop gain passes through unity. Resistors 89, 91 and 92 feed DC bias onto the Schottky diodes and the high frequency input signals, i.e., 10 KHz to 100 MHz, are coupled into the diodes via capacitors 93, 94, and 95. Amplifier 96 serves as a meter amplifier to give a relative signal strength indication.

Referring now to FIG. 6, the transmission line discriminator 33 utilized to FM demodulate at this high frequency of 2.6 GHz is shown in more detail. Transmission line forms of FM demodulator have not been widely used since they are sensitive to amplitude modulation as well as FM. However, since the limiter of this system performs so well in suppressing the AM, AM produces no serious problems for the transmission line discriminator.

An additional potential problem is that a transmission line has a tendency to have multiple responses to a frequency rather than one response similar to the single response of a tuned circuit; that is, it responds to harmonics as well as it responds to fundamentals. Reflections can therefore occur from the transmission lines returning at two, three and four times the frequency in, causing little ripples in the response.

As still another potential problem at lower frequencies the circuit is bulky; transmission lines may be several feet long at 200 MHz or so and even longer at 20 to 70 MHz, the typical IF frequency. However, at 2.6 GHz this problem is not encountered since the total length of each of the transmission lines utilized in this embodiment is about 3 inches on the sapphire.

The input from the directional detector 29 is split into two parts through two 50 ohm resistors 101 and 102 since this circuit is designed to be a 50 ohm discriminator. Coupled to each resistor is an associated transmission line 103 and 104, respectively, each of substantially equal length. Transmission line 103 is shorted at its end and line 104 is open at its end. These transmission lines are ⅛ wavelength long (or some other odd multiple of ⅛λ) at the center frequency of the discriminator. Between each resistor and associated transmission line there is inserted a diode detector 105 and 106, respectively. The detector diodes can be in either polarity; if connected in the same polarity the detector will detect the difference of the two signals while if the diodes are in opposite polarity, the sum of the two signals is detected. The capacitors 107 are used to bypass the RF to ground; these bypass capacitors are nominally 12 picofarads capacitors. Output capacitors 108 and 109 (about 30 microfarads) are tied together and lead to the amplifier 34 that has a 1K input impedance.

In operation and at the center frequency 2,600 MHz, a reactance is reflected back at the shorted line 103 which gives a close to half the full voltage out of the detector diode 105. The other line 104 operates to give a similar voltage of the opposite polarity from diode 106. These two voltages when added together at the output give 0 volts. Now assume a zero frequency input instead of the 2.6 GHz; the shorted line 103 presents a short so there is no voltage output on that side, i.e., 50 ohms in series with a dead short is zero so the diode has no output. The other side has an open line 104 with 50 ohms in series and there is full voltage on that side. As the frequency passes through the frequency at which the lines are 150 wavelength to a frequency at which the lines are ⅛ wavelength to a frequency at which the lines are ¼ wavelength long, the upper or shorted transmission line 103 looks like an open impedance so there is voltage on that side. However, the open line 104 is transformed into a short circuit and there is no voltage on this side; therefore the voltage output has been completely reversed. Thus, in one case there appeared zero voltage on one side and a plus voltage on the other side and just the opposite of this in the other case. There results a ramping voltage output from some negative level through zero to some positive level between these two frequency extremes, i.e., from zero frequency to 5.2 GHz. With the lines cut for the frequency 2.6 GHz, there is a fairly flat discriminator action from zero to 5,400 MHz which is wider than needed.

It is noted that because of the repetitive nature of transmission lines, as the frequency goes higher, the effect repeats itself with the output voltage ramping in the reverse direction until the input is four times the frequency at which the lines had been dimensioned. The end result is a triangular wave output similar to that shown in FIG. 7 which illustrates the discriminator output with the lines cut for 200 MHz. It is seen from this sawtooth trace that a ⅛λ, there is a zero voltage output, at ¼λ the output voltage is the maximum of one polarity, at ⅜λ there is again the zero voltage region, at ⅔λ the maximum of the second polarity, at ⅝λ the center voltage, etc. Therefor, at each odd eighth wavelength, there is a discriminator action region. Therefore, by cutting the lines for ⅝λ at 200 MHz, a discriminator action occurs at the 13/8λ point with the maximum negative voltage output at 2,400 MHz and a maximum positive voltage output at 2,800 MHz and zero voltage out at 2,600 MHz. This provides a steeper slope for the desired discriminator action than the slope obtained if the lines had been cut ⅛λ at 2,600 MHz.

Actually, in practice the voltage slope is not perfectly straight if the rate of change of slope is measured. There is a slight convex or concave slope with a 50 ohm transmission line. By changing the impedance of the transmission lines, this curve will change and the performance of the discriminator becomes more uniform across the frequency band. For this reason, a 70 ohm line is chosen since it optimized performance. Since the transmission lines were cut for discriminator action from 2,400 to 2,800 MHz and since the band of interest is 2,500 to 2,700 (actually the channels are only 100 MHz apart centered at 2,600 MHz), the discriminator action occurs close in to the center region of the voltage slope and, at 70 ohms, good discriminator action has been obtained.

Changing the impedance of the transmission lines disrupts the input impedance of the discriminator so that it is not 50 ohms at all frequencies; however, this has been compensated for by shortening the shorted line 103 slightly while at the same time lengthening the open line 104 slightly. As an example the shorted line is cut at 2.941 inches on sapphire while the open line is cut at 3.034 inches. This results in not only improving the input impedance but in flattening the discriminator action near the center of the band. Thus good sensitivity is obtained with this discriminator.

One problem encountered with this form of discriminator is the tendency for harmonics to be generated by the plural diodes. In order to suppress such harmonics, dissipative elements are placed in the lines at selected locations. A resistor 111, in this example 70 ohms, is connected between the open ended transmission line and ground at ¼λ (at 2,600 MHz) from the open end 112 of the line. A 70 ohm resistor 113 is inserted in series with the shorted transmission line, also ¼λ from the outer end 114. With respect to the open line 104, at 2,600 megacycles and ¼ wave down the line from the open end 112, this node appears as a short circuit at 2,600 megacycles and the 70 ohm resistor 111 to ground at this point makes no difference in the performance of the discriminator. However, at the second harmonic, i.e., 5,200 MHz, this shunt is ½ wavelength down the line and it transforms to an open line so that at this point there appears a 70 ohm resistor to ground across the open line. Therefore the line is terminated at the second harmonic and any second harmonic signal generated by the plural diodes is not reflected back.

On the shorted wavelength line 103, at 2,600 MHz and ¼ of the wavelength back, the 70 ohm resistor 113 in series with the very large existing impedance has no effect so there is no effect on this line at 2,600. But at the second harmonic (5,200 MHz) this point turns to a short circuit (½ wavelength at 5,200 MHz) and thus the second harmonic is shorted out in this line 103. Therefore, the discriminator performs properly at 2,600 MHz but at the second harmonic, i.e., 5,200 MHz, and all even harmonics thereafter, the two transmission lines 103 and 104 are terminated. The 70 ohm resistors create a little bit of loss but at 2,600 MHz the losses are minimal. The third harmonic, even though it isn't as completely absorbed as the second harmonic, is down greatly so that it creates very little problems. Actually the true frequencies are slightly offset from 2,600 MHz and since the reactance of these lines has appreciably shifted for the third and higher harmonics some real loss is realized and these harmonics are suppressed to some degree.

We claim:

1. A signal translating apparatus for suppressing amplitude variations appearing on an applied high frequency signal, the apparatus comprising:

- first and second means, each having a pair of inputs and an output for producing at the output thereof a signal which is representative of the combination of signals applied to the inputs thereof;
- means for coupling the output of the first means to one input of the second means;
- detector means for producing an output signal representative of amplitude variations of a high frequency signal applied thereto;
- means coupling the output of said second means to said detector means for applying a high frequency signal thereto from said second means;
- first circuit means for applying said output signal from said detector means to another input of the second means;
- second circuit means for applying said output signal from said detector means to one input of said first means, said second circuit means having a longer time constant than said first circuit means; and
- means coupled to another input of said first means for applying thereto a high frequency signal having amplitude variations which are to be suppressed.

* * * * *